(12) United States Patent
Stallings et al.

(10) Patent No.: US 8,799,806 B2
(45) Date of Patent: Aug. 5, 2014

(54) TABBED CONTENT VIEW ON A TOUCH-SCREEN DEVICE

(75) Inventors: Heath Stallings, Colleyville, TX (US);
Brian F. Roberts, Dallas, TX (US);
Donald H. Relyea, Jr., Dallas, TX (US);
Daniel Spurgeon Dunnam, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1095 days.

(21) Appl. No.: 12/347,640

(22) Filed: Dec. 31, 2008

(65) Prior Publication Data

US 2010/0169772 A1 Jul. 1, 2010

(51) Int. Cl.
*G06F 3/048* (2013.01)

(52) U.S. Cl.
USPC .......... 715/777; 715/783; 715/784; 715/825; 715/828

(58) Field of Classification Search
USPC .............. 715/702, 739, 777, 784; 345/173; 707/E17.016, E17.008, E17.009, 707/E17.044
See application file for complete search history.

(56) References Cited

U.S. PATENT DOCUMENTS

| | | | | |
|---|---|---|---|---|
| 5,491,784 A | * | 2/1996 | Douglas et al. | 715/810 |
| 5,657,460 A | * | 8/1997 | Egan et al. | 715/763 |
| 5,745,716 A | * | 4/1998 | Tchao et al. | 715/777 |
| 6,232,970 B1 | * | 5/2001 | Bodnar et al. | 715/708 |
| 7,432,928 B2 | * | 10/2008 | Shaw et al. | 345/473 |
| 7,475,359 B2 | * | 1/2009 | Hudson, Jr. | 715/777 |
| 7,574,669 B1 | * | 8/2009 | Braun et al. | 715/777 |
| 2002/0122063 A1 | * | 9/2002 | Weinberg et al. | 345/764 |
| 2006/0253801 A1 | * | 11/2006 | Okaro et al. | 715/810 |
| 2007/0050401 A1 | * | 3/2007 | Young et al. | 707/102 |
| 2007/0198947 A1 | * | 8/2007 | Cox et al. | 715/786 |
| 2007/0198948 A1 | * | 8/2007 | Toriyama | 715/790 |
| 2007/0266334 A1 | * | 11/2007 | Donaldson | 715/777 |
| 2008/0270931 A1 | * | 10/2008 | Bamford | 715/777 |
| 2010/0058240 A1 | * | 3/2010 | Bull et al. | 715/830 |

\* cited by examiner

*Primary Examiner* — Stephen Alvesteffer

(57) ABSTRACT

Content may be displayed on a touch-screen display of a device as part of a graphical interface in which the content is divided into categories or sections, and each category/section is associated with a graphical tab. The device may detect a selection of one of the graphic tabs based on a touch gesture received by the touch-screen display and display, on the touch-screen display, content items corresponding to the subset of content items for the selected tab.

25 Claims, 11 Drawing Sheets

TABBED CONTENT VIEW ON A TOUCH-SCREEN DEVICE

BACKGROUND INFORMATION

Electronic devices continue to increase in complexity and functionality. This poses several challenges to designers of such devices. For example, it may be difficult to develop and provide an intuitive, functional, and convenient user interface for an electronic device having robust functionality, especially when the device is small in size.

Recently, touch-screen displays have become popular user interfaces for certain electronic devices. Touch-screens are especially conducive to small electronic devices at least because they allow for an expansive set of user inputs and can replace other limited input interfaces such as dedicated mechanical input buttons. However, there remains room to improve upon standard touch screen interfaces.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Implementations described herein relate to touch-screen displays, such as a touch-screen implemented as part of a mobile phone or another device. Content may be displayed as part of a graphical interface in which the content is divided into categories or sections, and each category/section may be associated with a graphical tab. The user may conveniently navigate the content based on touch interaction with the tabs. In some implementations, the content may be remotely stored over a relatively slow network. In this situation, the device may cache content as necessary to potentially present a responsive interface even over a slow network.

Figure 1:
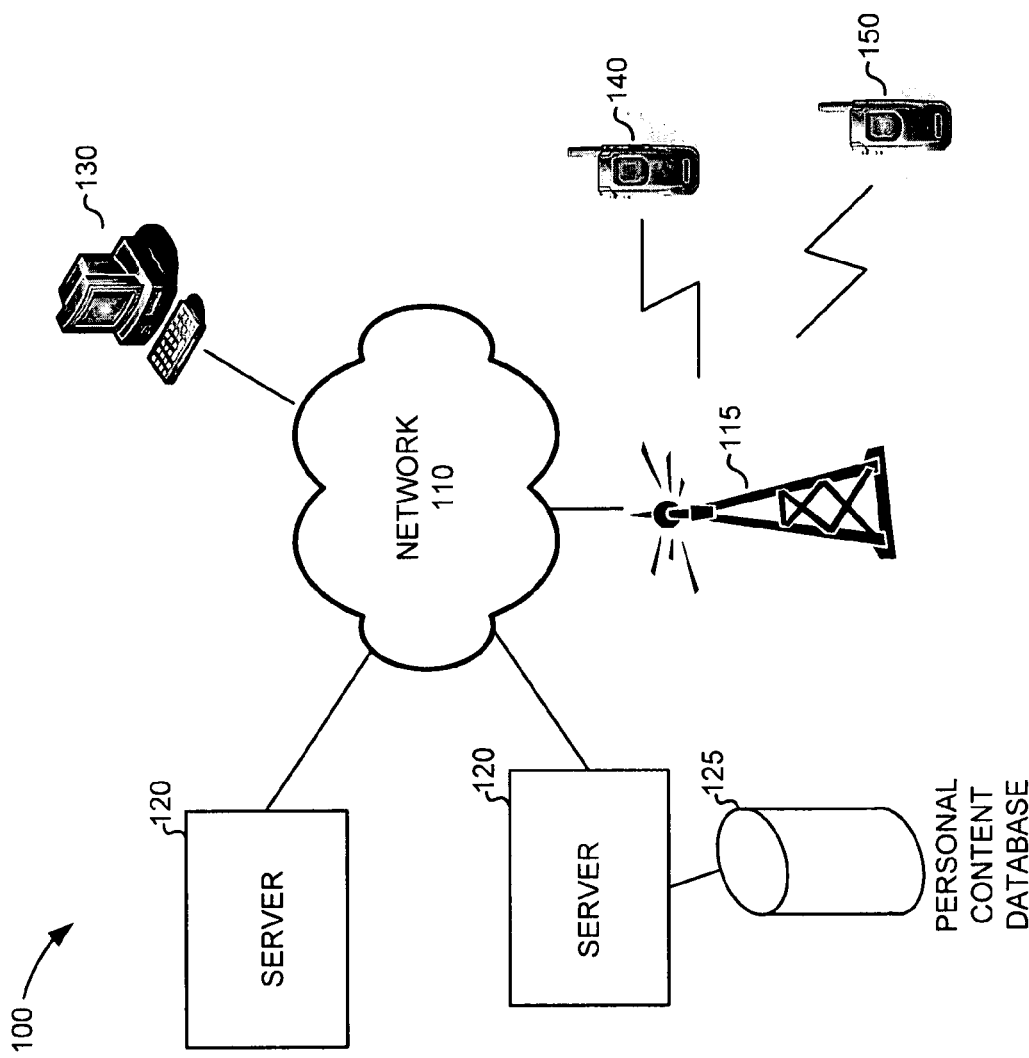
FIG. 1 is a diagram illustrating an exemplary system in which concepts described herein may be implemented.

FIG. 1 is a diagram of an exemplary system 100 in which concepts described herein may be implemented. As illustrated, system 100 may include a network 110 that connects one or more server devices 120 to end-user devices 130, 140, and 150. As shown, end-user device 130 may represent a computing device 130 and devices 140 and 150 may represent mobile phones. In general, server devices 120 may provide or control, via network 110, telecommunication services such as telephone, television, data network connectivity (e.g., Internet), and/or wireless mobile connectivity (e.g., cellular phone connectivity).

Network 110 may include a Local Area Network (LAN), a wide area network (WAN), such as a cellular network, a satellite network, a broadcast television based network, the Internet, a private WAN, or a combination of the Internet and a private WAN, that is used to transport data. Network 110 may include a number of separate networks that function to provide services to end-user devices 130, 140, and 150.

An antenna 115 is also shown in FIG. 1 to illustrate that network 110 may include wireless nodes, such as nodes used to implement a cellular network. Mobile phones 140 and 150 may, for instance, connect to voice and data services through a cellular network that includes network 110 and antenna 115.

Server devices 120 may include servers or other network devices used to deliver or control delivery of the telecommunication services to computer device 130 and/or mobile phones 140 and 150. For example, server devices 120 may include web servers, network switches or routers, network gateways, television broadcast facilities, etc.

In one particular implementation, servers 120 may deliver content to mobile phones 140 and 150. The content may be, for example, generally available content, such as web pages or personal content. A personal content database 125 is shown in FIG. 1 as connected to one of servers 120. Personal content database 125 may be a database or other structure that stores, for instance, private user data such as documents, images, or multi-media content. Server 120 may deliver the content (e.g., from personal content database 125) to mobile phones 140 and 150, as desired by the users of mobile phones 140 and 150.

Computing device 130 may include for example, a personal computer, such as a desktop computer, a laptop computer, a personal digital assistant (PDA), etc., used for general computing tasks. A user of computing device 130 may connect through network 110 to communicate with other user devices or servers connected to network 110.

Mobile phones 140 and 150 may include any mobile communication device. Mobile phones 140 and 150 may wirelessly connect through network 110 to other devices. Mobile phones 140 and 150 may, for instance, be used to place telephone calls with landline phones or other mobile phones, view content (e.g., web content, personal documents, multi-media content) received from servers 120, and/or send and receive instant messages. Mobile phones 140 and 150 may particularly be, for instance, cell phones, personal digital assistants (PDAs), or smart phones. In one implementation, mobile phones 140 and 150 may include touch-sensitive screens, called touch-screens herein, with which a user may interact.

Figure 2:
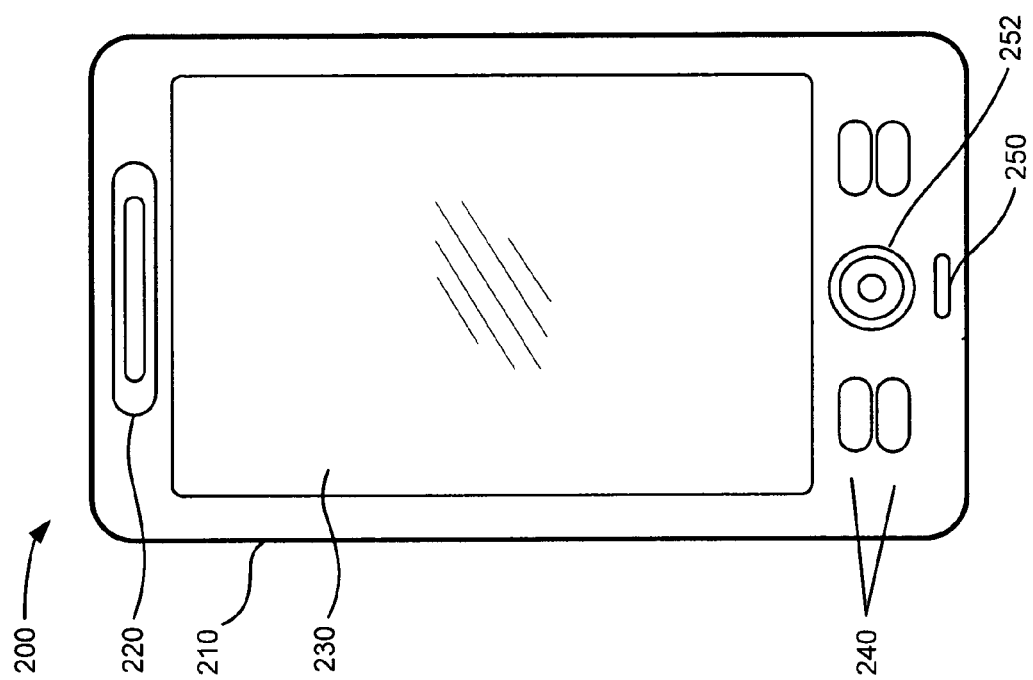
FIG. 2 is a diagram illustrating an exemplary device that includes a touch-screen display.

FIG. 2 is a diagram illustrating an exemplary device 200 that may include a touch-screen, such as one of mobile phones 140 or 150. Device 200 may include a housing 210, a speaker 220, a touch-screen display 230, control buttons 240, and/or a microphone 250. Housing 210 may protect the components of device 200 from outside elements. Housing 210 may include a structure configured to hold devices and components used in device 200, and may be formed from a variety of materials. For example, housing 210 may be formed from plastic, metal, or a composite, and may be configured to support speaker 220, touch-screen 230, control buttons 240, and/or microphone 250.

Speaker 220 may provide audible information to a user of device 200. Speaker 220 may be located in an upper portion of device 200, and may function as an ear piece when a user is engaged in a communication session using device 200. Speaker 220 may also function as an output device for music and/or audio information associated with games and/or video images played on device 200.

Touch-screen display 230 may provide visual information to the user. For example, touch-screen 230 may display text, images, video, and/or graphics received from another device, and/or information regarding incoming or outgoing calls or text messages, emails, media, games, phone books, address books, the current time, etc. In one example, display 230 may include a liquid crystal display (LCD), such as a thin film transistor (TFT) LCD, etc.

In one implementation, touch-screen 230 may be configured to receive user input when a user touches (or comes in close proximity to) touch-screen 230. For example, the user may provide an input to touch-screen 230 directly, such as via the user's finger, or via other devices, such as a stylus. User inputs received via touch-screen 230 may be processed by components and/or devices operating in device 200. The touch-screen 230 may permit the user to interact with device 200 in order to cause device 200 to perform one or more operations. Exemplary technologies to implement a touch screen on touch-screen 230 may include, for example, a near-field-sensitive (e.g., capacitive) overlay, an acoustically-sensitive (e.g., surface acoustic wave) overlay, a photo-sensitive (e.g., infrared) overlay, a pressure sensitive (e.g., resistive) overlay, and/or any other type of touch panel overlay that allows touch-screen 230 to be used as an input device. Touch-screen 230 may also identify movement of a body part or a pointing device as it moves on or near the surface of the touch-screen-enabled display 230.

Further, in some implementations, touch-screen 230 may be configured to distinguish between different touch pressures. For instance, a user may touch and move a finger over touch-screen 230 to emulate movement of a pointing device and may then press harder on touch-screen 230 to select an object.

Control buttons 240 may permit the user to interact with device 200 to cause device 200 to perform one or more operations. For example, control buttons 240 may be used to cause device 200 to transmit information. Microphone 250 may receive audible information from the user. For example, microphone 250 may receive audio signals from the user and may output electrical signals corresponding to the received audio signals.

Control buttons 240, or other controls associated with device 200, may also be used to interact with the display to potentially perform actions similar to those that could be performed via touch interaction with a touch-screen display. For example, control buttons 240 may be arranged to include a directional pad (D-pad) that can be used to input directional signals to device 200. The D-pad may include, for instance, four buttons through which a user can input "up", "down", "right", or "left" signals. The buttons of the D-pad may be arranged so that they can be easily actuated using, for example, a thumb or other finger. An exemplary D-pad 252 is particularly shown in FIG. 2 as a round pad that a user may actuate in different directions with a finger.

Although FIG. 2 shows exemplary components of device 200, in other implementations, device 200 may contain fewer, different, differently arranged, or additional components than depicted in FIG. 2. For example, in some implementations, device 200 may include a keypad, such as a standard telephone keypad, a QWERTY-like keypad (e.g., a traditional configuration of typewriter or computer keyboard keys), or another keypad layout. In still other implementations, a component of device 200 may perform one or more tasks described as being performed by another component of user device 200.

Figure 3:
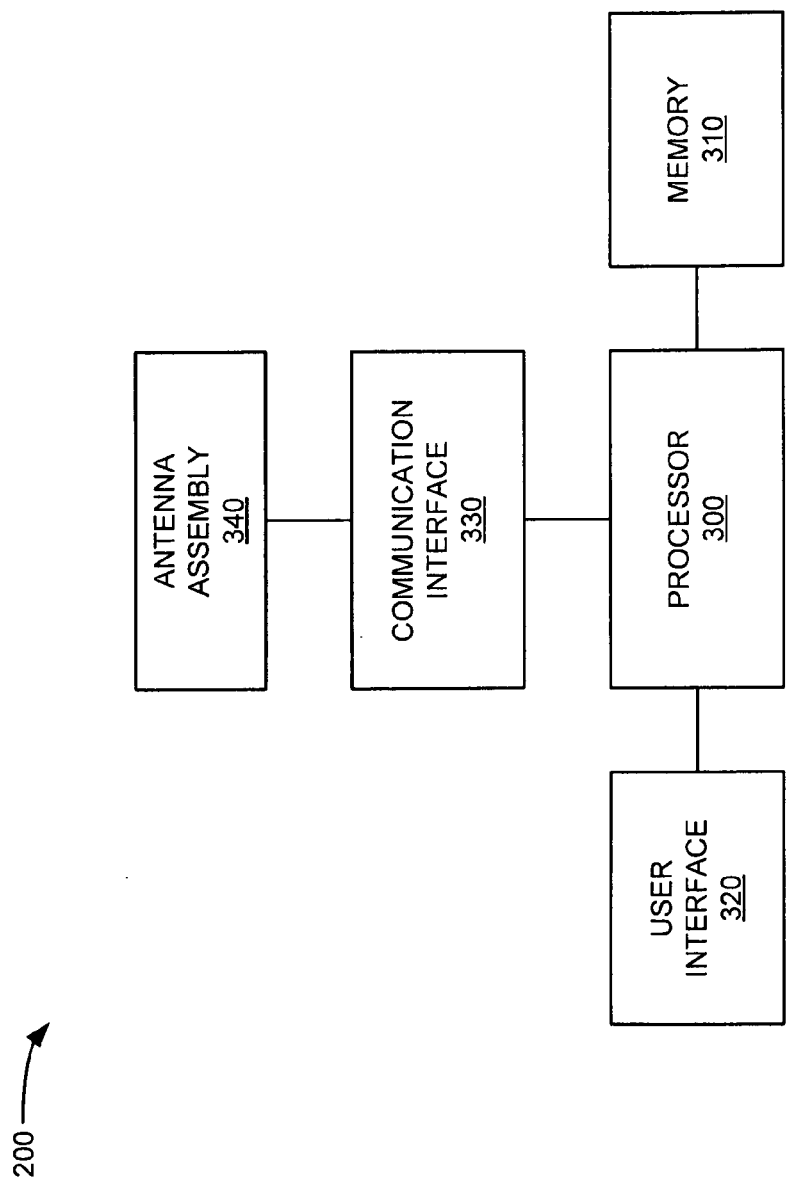
FIG. 3 is a diagram illustrating exemplary components of the device shown in FIG. 2.

FIG. 3 is a diagram of exemplary components of device 200. As illustrated, device 200 may include a processor 300, a memory 310, a user interface 320, a communication interface 330, and/or an antenna assembly 340.

Processor 300 may include one or more microprocessors, application specific integrated circuits (ASICs), field programmable gate arrays (FPGAs), or the like. Processor 300 may control operation of device 200 and its components. In one implementation, processor 300 may control operation of components of device 200 in a manner described herein.

Memory 310 may include a random access memory (RAM), a read-only memory (ROM), and/or another type of memory to store data and instructions that may be used by processor 300. In one implementation, memory 310 may store instructions for displaying content using a graphical interface that will be described in more detail below.

User interface 320 may include mechanisms for inputting information to device 200 and/or for outputting information from device 200. Examples of input and output mechanisms might include buttons (e.g., control buttons 240, keys of a keypad, a joystick, etc.); a speaker (e.g., speaker 220) to receive electrical signals and output audio signals; a microphone (e.g., microphone 250) to receive audio signals and output electrical signals; a display (e.g., display 230) to receive touch input and to output visual information; a vibrator to cause device 200 to vibrate; and/or a camera to receive video and/or images.

Communication interface 330 may include, for example, a transmitter that may convert baseband signals from processor 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As will be described in detail below, device 200 may perform certain operations described herein in response to processor 300 executing software instructions of an application contained in a computer-readable medium, such as memory 310. A computer-readable medium may be defined as a physical or logical memory device. A logical memory device may include a space within a single physical memory device or spread across multiple physical memory devices. The software instructions may be read into memory 310 from another computer-readable medium or from another device via communication interface 330. The software instructions contained in memory 310 may cause processor 300 to perform processes that will be described later. Alternatively, hard-wired circuitry may be used in place of or in combination with software instructions to implement processes described herein. Thus, implementations described herein are not limited to any specific combination of hardware circuitry and software.

Although FIG. 3 shows exemplary components of device 200, in other implementations, device 200 may contain fewer, different, differently arranged, or additional components than depicted in FIG. 3. In still other implementations, a component of device 200 may perform one or more other tasks described as being performed by another component of device 200.

Figure 4:
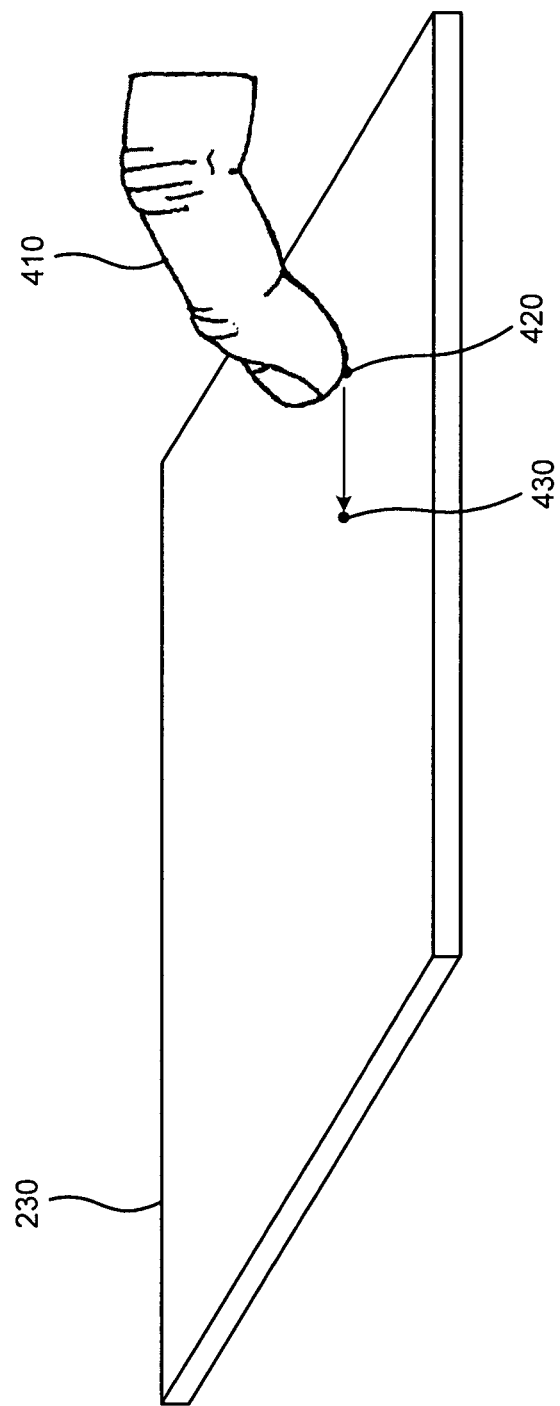
FIG. 4 is a perspective view illustrating exemplary interaction with a touch-screen.

FIG. 4 is a perspective view illustrating interaction with touch-screen 230 by an object 410. In this example, object 410 is the finger of a user. In general, any object that may be sensed by the touch-screen 230 may be used to interact with touch-screen 230. For example, object 410 may include a stylus or any other physical object that can touch and be sensed by touch-screen 230.

When object 410 touches position 420 as shown, touch-screen interface 230 may sense the object touch at position 420 and generate and provide at least one signal representative of the object touch. The signal may be processed by, for example, processor 300, to detect the object touch at position 420 and to perform an action in response to the detected object touch. Processor 300 may be configured to recognize any object touch as may suit a particular implementation, including a generally stationary, temporary, and/or sustained object touch. In certain embodiments, an object touch may include a sustained, generally stationary touch of a position 420 on touch-screen 230 by object 410.

While touching touch-screen 230, object 410 may move about on the surface (e.g., slide across the surface) of touch-screen 230. Such movement of object 310 while touching touch screen 230 may be referred to herein as a "touch gesture." A touch gesture may include any movement of object 410 from a starting position (e.g., position 420) to one or more other positions on touch-screen 230, such as position 430. A touch gesture may include a movement in a particular direction and may thus be associated with a particular direction. Such a touch gesture may be referred to as a "directional touch gesture."

FIG. 4 illustrates an exemplary directional touch gesture including movement of object 410 beginning at position 420 and in a direction represented by arrow 430 in FIG. 4. The example shown in FIG. 4 is just one example of a directional touch gesture. In this example, the directional touch gesture comprises a generally linear movement in a particular direction away from position 420. This is illustrative only. Other directional touch gestures may be used and recognized by touch-screen 230.

Figure 5:
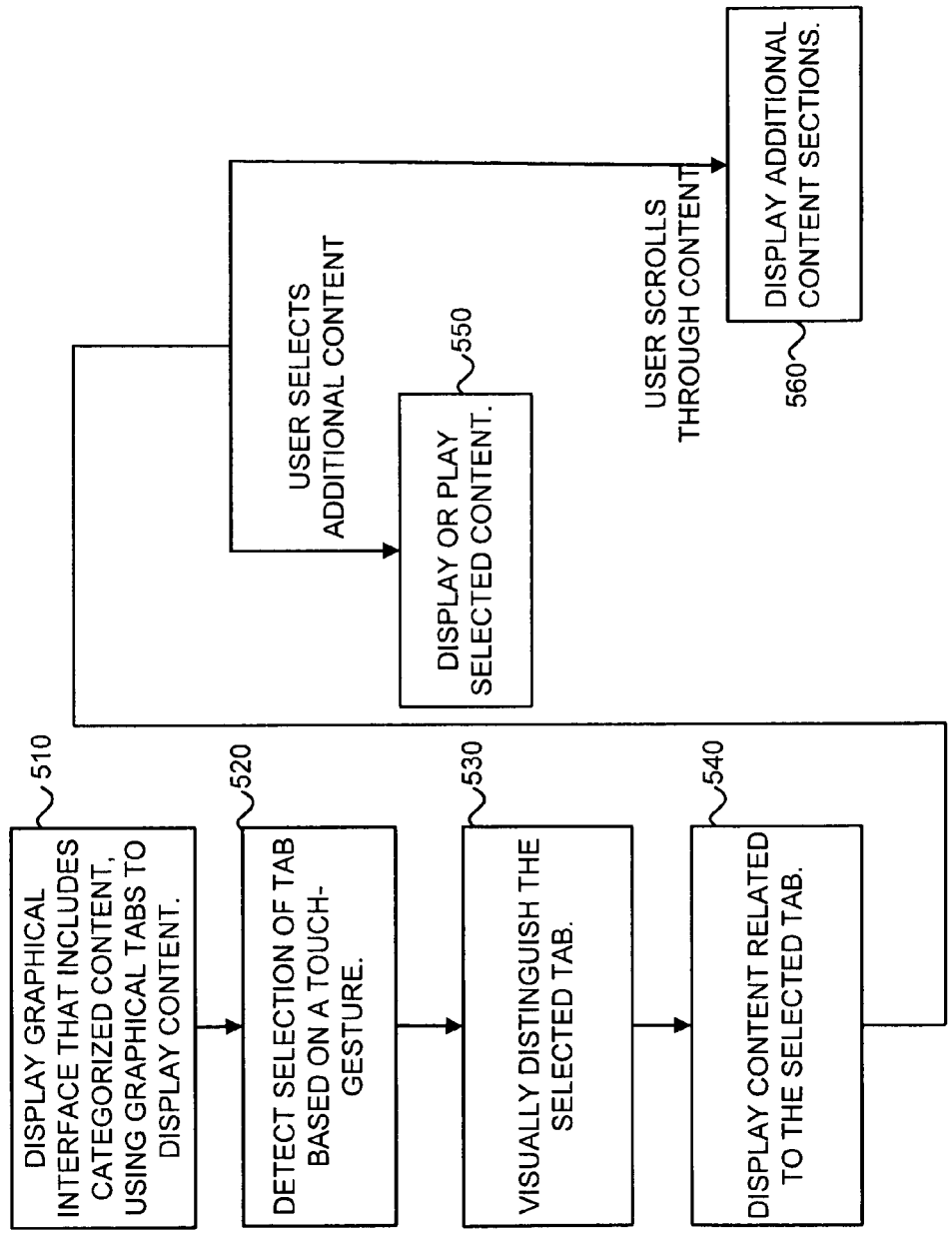
FIG. 5 is a flow chart illustrating exemplary operations for operating the device shown in FIG. 2.

FIG. 5 is a flow chart illustrating exemplary operations for operating the device to present content to a user. A graphical interface that includes graphic tabs may be presented to the user. The tabs may help organize content with which the user is interested. The user may interact with the tabs, and hence the content, through touch-screen 230. The tabs may correspond to categories or sections of the content.

As particularly shown in FIG. 5, device 200 may display a graphical interface that includes categorized items of content (block 510). Graphical tab objects may be displayed to help navigate the content (block 510). The graphical interface may be displayed, for example, as part of a "content viewer" or search application that the user initiates from device 200.

Figure 6:
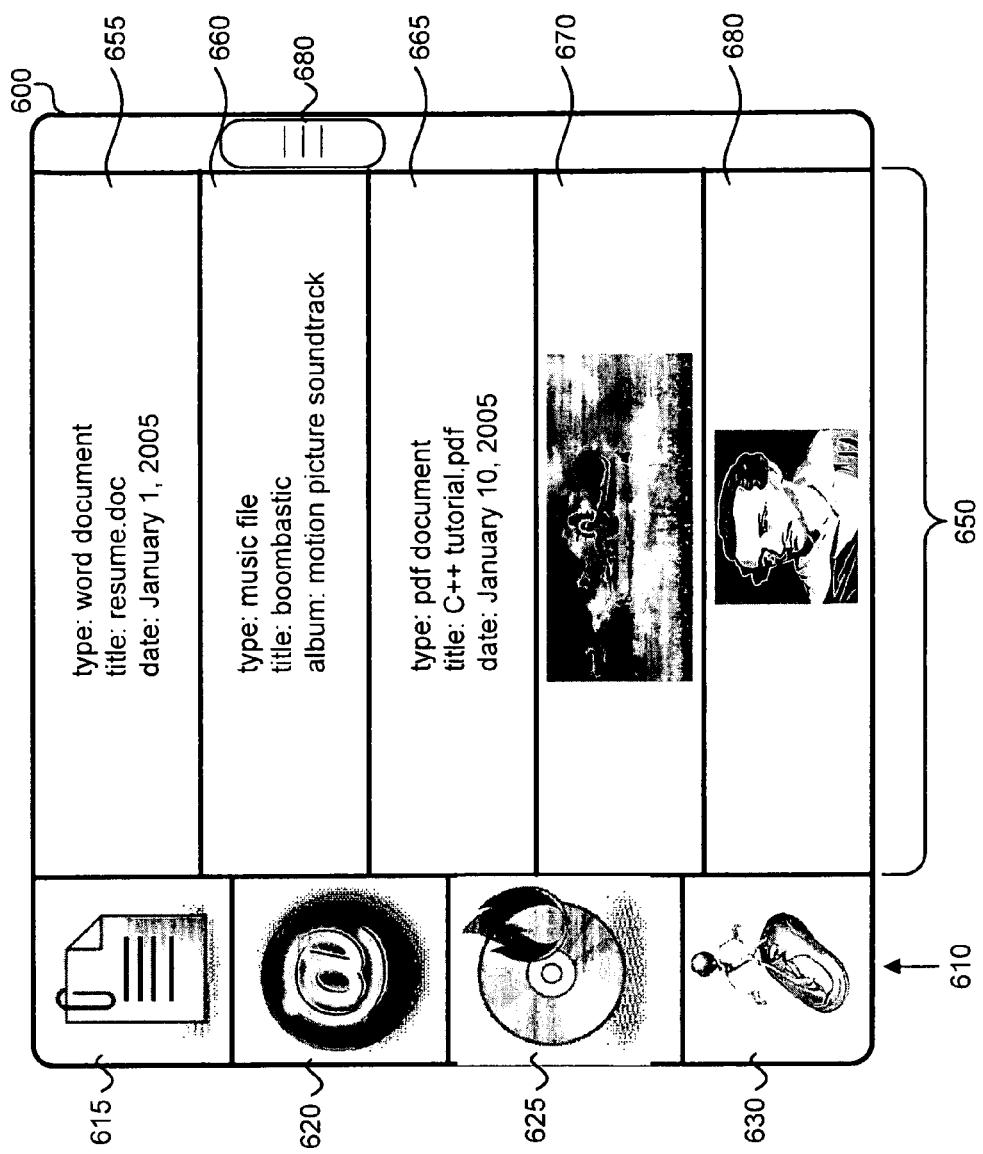
FIG. 6 is a diagram illustrating an exemplary graphical interface that may present categorized content.

FIG. 6 is a diagram illustrating an exemplary graphical interface 600 that may present categorized content, such as the graphical interface of block 510. Graphical interface 600 may be displayed, for instance, in response to the user requesting to view information (content). For example, the user may perform a search or request to view their files, such as files stored at personal content database 125 or on device 200. The user may, for instance, store a number of different types of files in personal content database 125, such as word processing documents, music files, spreadsheets, saved web pages, or other files. The files may, in aggregate, be relatively large. Accordingly, it may be impractical or undesirable to download all the results of a search, as doing so may take up too much time or resources, particularly if the network connection is not particularly fast.

In addition to a search for information, graphical interface 600 may be displayed at other times, such as when the user is browsing groups of files, such as music files or documents. In the case of music files, for instance, the files may be categorized by genre and in the case of documents, the files may be categorized by the type of file. In some instances, the files being browsed may have no natural categorization, and the categorization may be based on, for example, an alphabetical or sequential partitioning of the files.

In any case, device 200 may obtain a list or set of links or other references to content items based on the user request for information.

As particularly shown in FIG. 6, graphical interface 600 may include a navigation bar 610 that includes a number of graphic tabs 615, 620, 625, and 630. Each tab may represent a section categorization of the information being presented. In this example, assume that the user performed a search of the user's files. Each of tabs 615, 620, 625, and 630 may represent a type of file that matched the search. Tab 615 may represent documents such as word processing and spreadsheet documents, tab 620 may represent web pages or links, tab 625 may represent multi-media files, and tab 630 may represent uncategorized files.

Graphical interface 600 may also include a content display area 650. Content display area 650 may display the content. As particularly shown in FIG. 6, content display area 650 may be divided into sections 655, 660, 665, 670, and 675. Each section may display, for instance, a single document or file, or a link or a snippet (summary information), for the content being browsed. For example, section 655 may show summary information for a word processing document, section 660 may show information for a music file, section 665 may show summary information for a portable document format (pdf) file, and sections 670 and 675 may display thumbnail representations of images or photographs.

Graphical interface 600 may also include other graphical control elements. For example, a scroll bar 680 may be included in graphical interface 600. A user may interact with scroll bar 680 by, for example, touching and performing an up or down directional movement gesture. In response, device 200 may scroll the content shown in sections 655-675.

As previously mentioned, the content, or at least part of the content, being browsed through graphical interface 600 may be stored remotely at a device connected via network 110. Device 200 may cache and intelligently download content over network 110 to provide a relatively smooth interface even over potentially slow network links. This aspect of device 200 will be described in more detail below with reference to FIG. 10.

In some implementations, tabs may be dynamically created and added to graphical interface 600 as new content is received over network 110. For instance, device 100 may initially display tabs 615, 620, 625, and 630, and then as new content associated with a different section or category is received over network 110, the new tab may be added to the list of tabs shown in FIG. 6. Similarly, the content may be dynamically modified as the user edits the content. For example, the content may correspond to contacts in a contact storage application. Assume that the user adds a new contact entry for someone whose last name begins with "Sh". If the tabs are labeled to indicate sections of the alphabet, such as "Sa-St", device 100 may dynamically change the tab labels to rearrange the labels (e.g., a tab may now be labeled "Sa-Sh") based on the modified content.

Referring back to FIG. 5, a user may quickly browse through the content presented by graphical interface 600 by selecting tabs 615, 620, 625, and 630. More particularly, device 200 may detect selection of one of tabs 615, 620, 625, or 630 based on a gesture on the selected tab (block 520). For instance, the user may touch on touch-screen display 230, with a finger or stylus, the tab in which the user is interested. Alternatively, the gesture may be a gesture made through a directional pad, such as D-pad 252.

In response to the detection of a tab being selected by the user, device 200 may visually highlight or distinguish the selected tab (block 530). The visual highlighting may provide feedback to the user confirming the selection of the tab.

Figure 7:
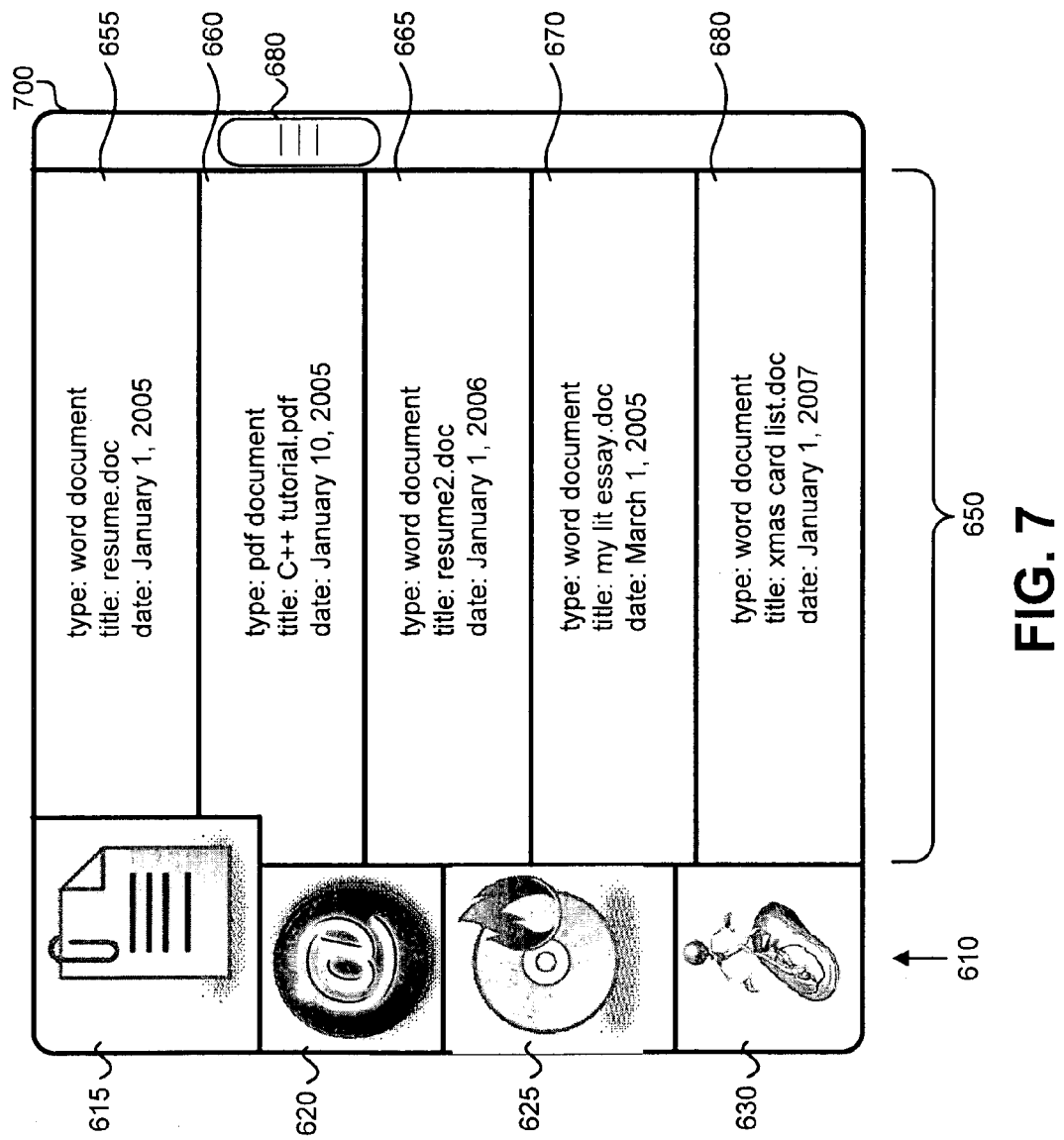
FIG. 7 is a diagram illustrating an exemplary graphical interface illustrating user selection of a tab.

FIG. 7 is a diagram illustrating an exemplary graphical interface 700, similar to graphical interface 600, in which the user has selected a tab. Assume that the user has selected tab 615. In this example, tab 615 may be visually highlighted by enlarging tab 615 relative to tabs 620, 625, and 630. It can be appreciated that there are many other ways in which a tab can be visually highlighted. For example, in alternative implementations, instead of or in addition to changing the size of tab 615, device 200 may change the color, add a distinctive visual pattern to the tab (e.g., make the tab blink or make the tab brighter), rotate the graphic displayed in the tab, change the graphic displayed in the tab, etc.

Returning to FIG. 5, content relating to the selected tab may be displayed in the content display area 650 (block 540). As particularly shown in FIG. 7, the user has selected document tab 615. Accordingly, only documents relevant to selected document tab 615 are shown in context sections 655-675.

The user may perform other actions relevant to the content shown in content sections 655-675. For example, the user may in some way select a content section, such as by touching or touching and holding (e.g., sustaining contact with) the desired section. In this case, device 200 may present (e.g., display or play) the selected content to the user (block 550). Device 200 may present the selected content using an action that may vary based on the type of selected content. For example, for a word processing document, device 200 may start a document editor. For a music file, device 200 may begin to play the file. For a photograph, device 200 may start photo editing or viewing software.

The user may also move scroll bar 680 to display additional content sections (block 560). In this case, device 200 may scroll to show next (or previous) results that correspond to the selected tab.

In some implementations, if all the results for a selected tab are exhausted, device 200 may begin to show results for the next tab in response to a scroll operation. The tab corresponding to the next tab may be accordingly visually highlighted.

Figure 8:
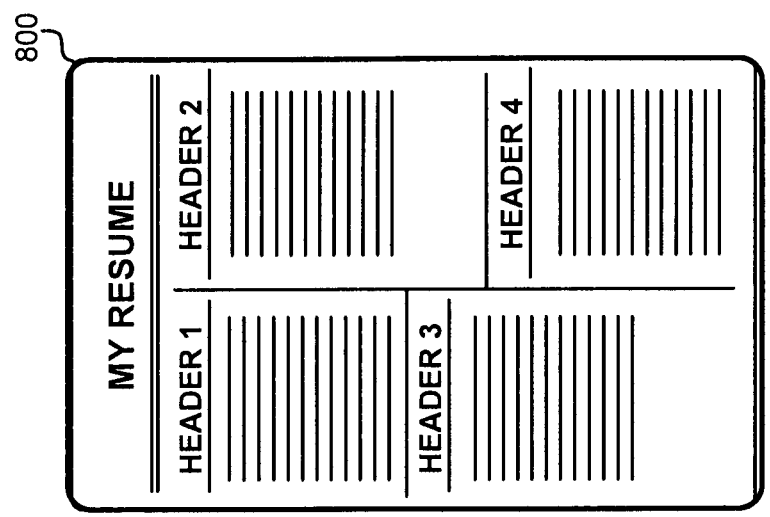
FIG. 8 is a diagram illustrating an exemplary graphical interface illustrating selection of a content section.

FIG. 8 is a diagram illustrating an exemplary graphical interface 800, after selection of a content section, such as performed in block 550. In this example, assume that the user chooses to view the content "resume.doc" (FIG. 6, content section 655). In response, device 200 may initiate a word processing or document viewing application, which may present graphical interface 800. At this point, the user may be able to edit or view the document in detail.

The examples given above for displaying categorized content were based on categories determined based on document type. It can be appreciated that generally any technique could be used to categorize or otherwise divide content into sections. In some situations, for instance, the categorization may be based on an alphabetical or sequential partitioning of the files.

Figure 9:
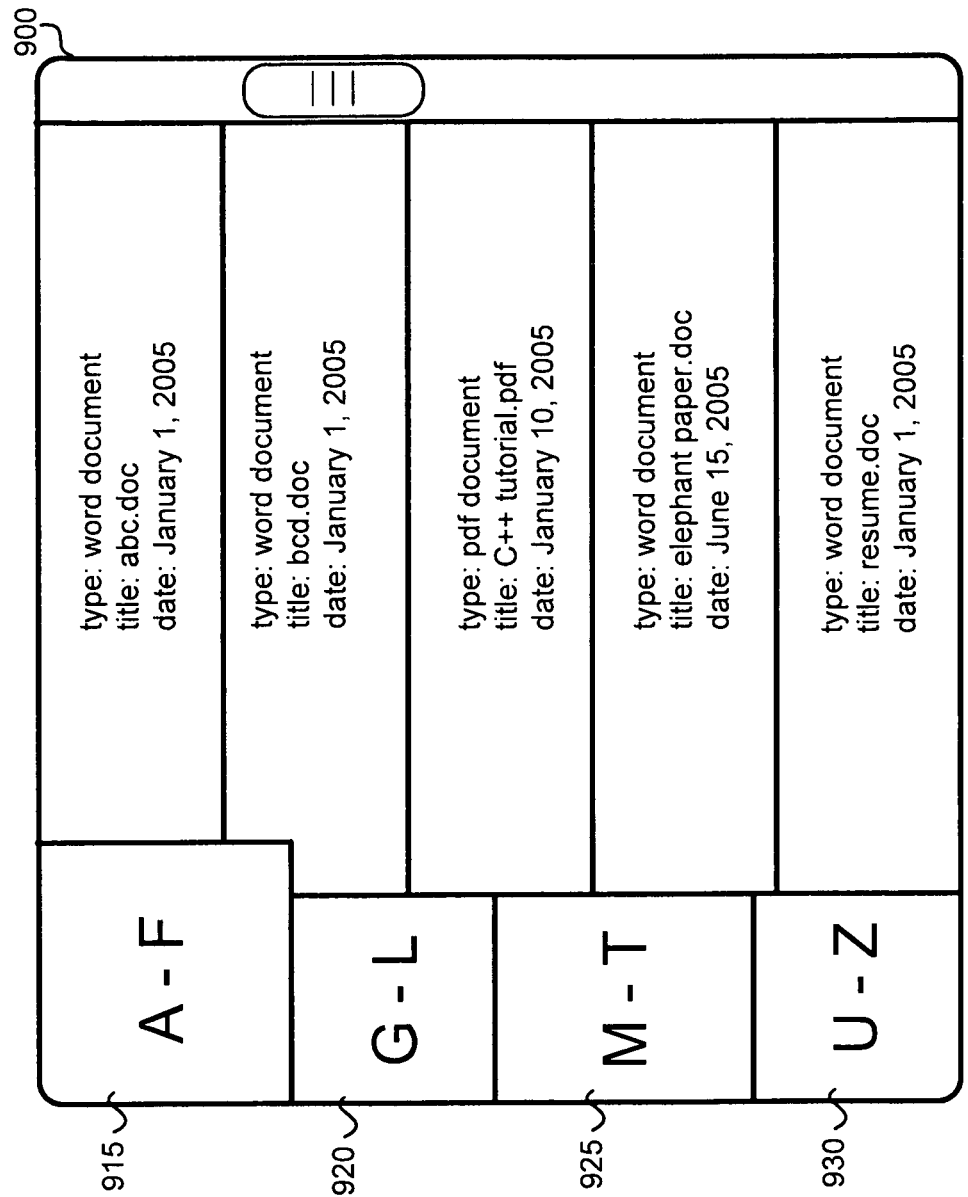
FIG. 9 is a diagram illustrating another exemplary graphical interface.

FIG. 9 is a diagram illustrating an exemplary graphical interface 900. Graphical interface 900 may be similar to graphical interface 700, except that the graphics shown in category tabs 915-930 may be shown as simple text ranges. In this example, assume that the files being viewed by the user are all word processing documents, and device 200 is displaying the documents based on an alphabetical sorting of the documents. As shown, tab 915 may include documents with titles beginning with A-F, tab 920 may include documents with titles beginning with G-L, tab 925 may include documents with titles beginning with M-T, and tab 930 may include documents with titles beginning with U-Z.

As previously mentioned, at least some of the content that is included in the information provided by device 200 may be content that is not stored locally on device 200. Further, because of capacity constraints of device 200 or bandwidth constraints of network 110, it may not be desirable to download all of the content corresponding to an information request. Consistent with aspects described herein, device 200 may download the content as-needed based on the user's interaction with the graphical interface.

Figure 10:
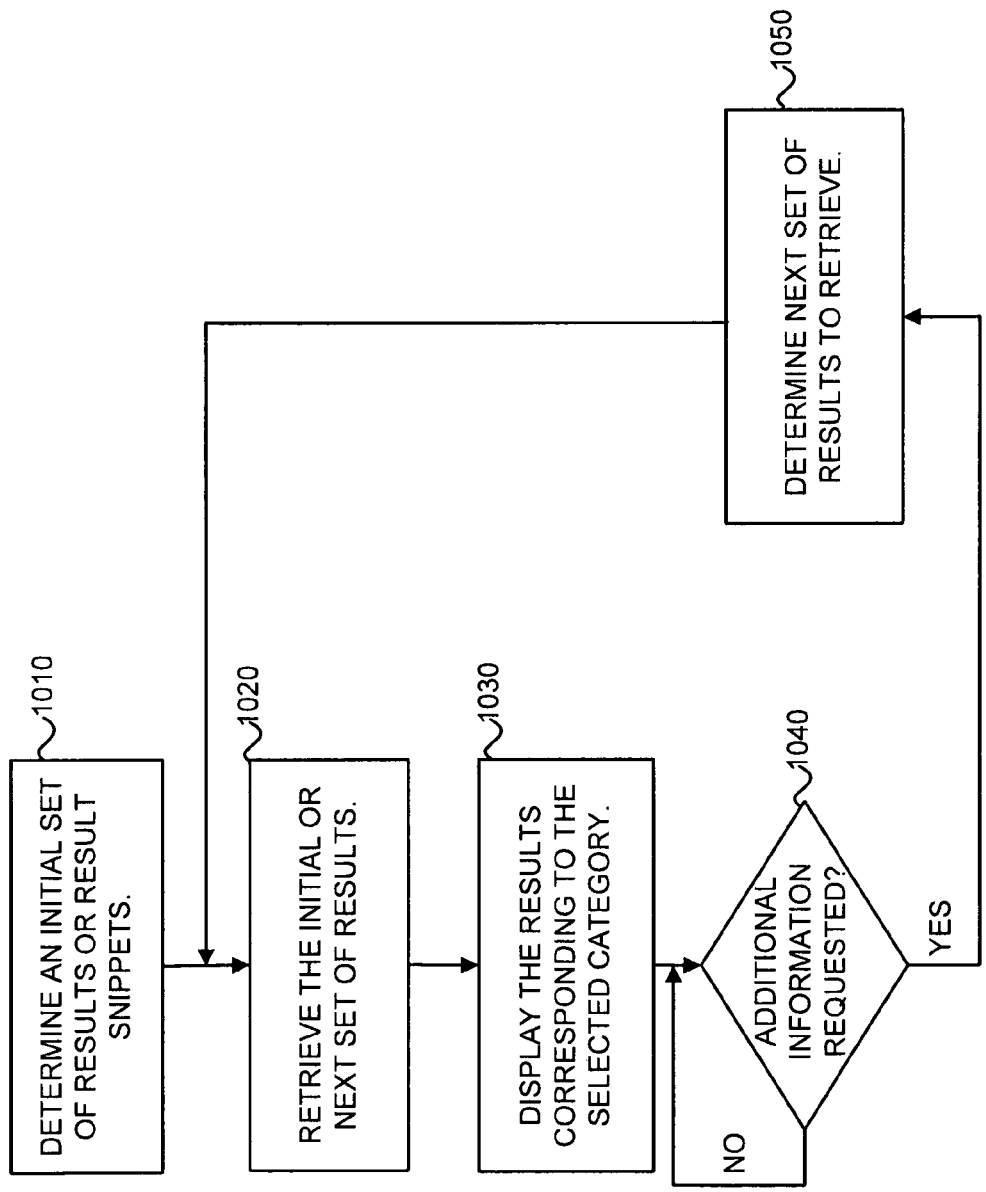
FIG. 10 is a flow chart illustrating exemplary operations for downloading content on an as-needed basis over a network.

FIG. 10 is a flow chart illustrating downloading content on an as-needed basis over network 110. In response to a user request for information, such as, for example, a search of the user's files, a search of public files on a wide area network (e.g., the Internet), or a request to view a certain type of file (e.g., all music files), device 200 may determine an initial set of results or result snippets to retrieve (block 1010). The initial set may be a subset of the entire set of results. The initial set of results may be initially stored at one or both of device 200 or a remote device, such as at personal content database 125. In situations where at least some of the initial set of results is stored remotely, device 200 may request the needed information over network 110.

As mentioned, the determined initial set of results may be a subset of the entire set of requested results. What constitutes the subset may be preconfigured for device 200 or configured based on user options. For example, device 200 may request the top ten results in any category tab as part of the initial set of results. Alternatively, device 200 may wait until a user selects a particular category tab (FIG. 5, block 520) before requesting any results. Further, the results requested may be a summary description (snippet) of information corresponding to the content. For example, for a document such as an email or music file, only the title may be requested. For a photo, only a small thumbnail of the photo may be initially requested.

In some implementations, the initial set of results may differ based on the location of the results. For examples, for large files located across a relatively slow network, such as a cellular network, only a limited number of results for each category may be requested. For a faster connection, such as if the files are stored locally on device 200 or over a fast connection (e.g., local area network connection or wired connection), a larger number or all of the results for each category may be requested.

Device 200 may retrieve the current set (e.g., the initial set or selected set) of results (block 1020). Device may display the results corresponding to the selected category (block 1030). For example, as shown in FIG. 6, graphical interface 600 may display results for content sections 655-680. In response to a user request for additional information, (block 1040), such as a category change or a request to "scroll down" to view more results, device 200 may determine the next set of results to retrieve (block 1050). The next set of results may be determined similarly to the initial set of results and based on the user request. For example, if the user changes category tabs, device 200 may determine the next set of results as results from the new category tab. If the user requests more results from the current category, device 200 may retrieve additional results from the category.

Device 200 may next retrieve and present, as appropriate, the next set of results (block 1050). Results not present on device 200 may be retrieved remotely.

In some implementations, device 200 may attempt to predict what content the user will next request. Device 200 may then request this content before it is actually requested by the user. For instance, if a user is viewing the first ten results for a tab, device 200 may begin to load the next ten results for the tab even before the user has scrolled to request the results. Pre-fetching content is known in the art and will not be described in detail herein.

Device 200, as described above with reference to FIG. 10, can effectively cache documents that are requested as part of the results of a search or other request for categorized documents. A graphical interface, such as graphical interface 600, including tabs 655-680, may be used to easily navigate to selected content, and together with the dynamic downloading of files over a network such as network 110, can provide a responsive and easily navigatable user interface for exploring or viewing content, even when data is stored remotely over a relatively slow network (e.g., certain cellular networks).

Figure 11:
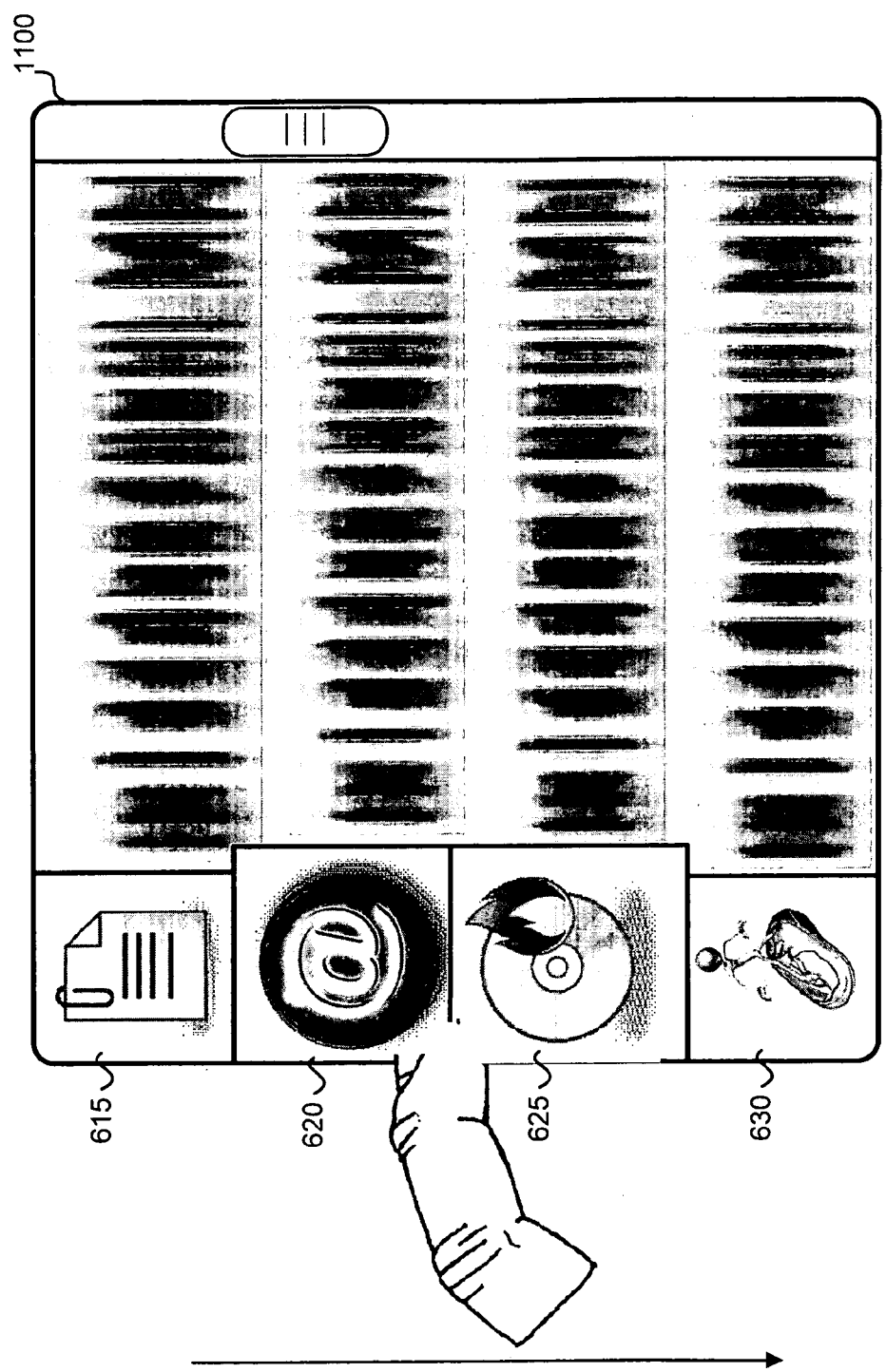
FIG. 11 is a diagram illustrating an exemplary graphical interface illustrating a rapid touch-screen directional movement gesture over multiple tabs.

FIG. 11 is a diagram illustrating an exemplary graphical interface 1100 illustrating a rapid directional touch gesture over multiple tabs. In this example, assume that the user is selecting tab 615 and then decides to move to tab 630. The user may quickly slide their finger over the intervening tabs, tabs 620 and 625. In response, device 200, instead of potentially retrieving and displaying the content for tabs 620 and 625, may determine that because the user interaction is a quick directional movement gesture, may instead show a graphical "blur" display (any graphic display or animation designed to represent rapid motion of content or changing of content in which undistinguishable content "blurs" for the user) until the user reaches tab 630 and stops the sliding motion. This may provide intuitive feedback to the user to confirm a rapid navigation motion without requiring excessive data requests over network 110. From the user's perspective, the user may be able to easily and responsively navigate a potentially large collection of data delivered over a relatively slow network connection. By using a quick directional movement and a "blur" display, device 100 may present the user with the impression that the user can "teleporting" to various sections of the content.

The foregoing description of implementations provides illustration, but is not intended to be exhaustive or to limit the implementations to the precise form disclosed. Modifications and variations are possible in light of the above teachings or may be acquired from practice of the teachings.

In addition, while series of blocks and/or acts have been described with regard to the process illustrated in FIGS. 5 and 10, the order of the acts and/or blocks may be modified in other implementations. Further, non-dependent acts may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise.

What is claimed:

1. A computing device-implemented method comprising:
   displaying, by the computing device, a graphical interface on a display associated with the computing device,
      the graphical interface including a plurality of selectable graphic tabs and a plurality of different content items,
         each of the plurality of selectable graphic tabs being associated with at least one of the plurality of different content items;
   detecting, by the computing device, a selection of a graphic tab, of the plurality of selectable graphic tabs, based on a gesture made by a user of the computing device;
   determining, by the computing device and based on the detected selection a set of content items, of the plurality of different content items, that corresponds to the selected graphic tab;
   displaying, by the computing device and on the display, the set of content items that corresponds to the selected graphic tab;
   displaying, by the computing device and on the display, the plurality of selectable graphic tabs; and
   removing from display, by the computing device, each of the plurality of different content items that do not correspond to the selected graphic tab.

2. The computing device-implemented method of claim 1, where the display includes a touch-screen display.

3. The computing device-implemented method of claim 1, where the gesture includes a gesture made on a touch-screen display or a gesture input through a directional pad.

4. The computing device-implemented method of claim 1, where, when displaying the plurality of different content items, the method includes:
   displaying, for each content item, of the plurality of different content items, at least one of:
      the content item,
      summary information about the content item, or
      a link to the content item.

5. The computing device-implemented method of claim 1, further comprising:
   retrieving the plurality of different content items from a remote server based on the detected selection of the graphic tab.

6. The computing device-implemented method of claim 5, where the remote server is part of a cellular network.

7. The computing device-implemented method of claim 1, where, when displaying the graphical interface, the method further includes:

modifying the graphical interface to include additional graphic tabs as additional content items, corresponding to the additional graphic tabs, are received from a remote server.

8. The computing device-implemented method of claim 1, where the plurality of different content items include at least one of:
   multi-media files,
   documents, or
   photos.

9. The computing device-implemented method of claim 1, further comprising:
   visually distinguishing, based on the detected selection, the selected graphic tab from one or more non-selected graphic tabs of the plurality of selectable graphic tabs.

10. The computing device-implemented method of claim 1, further comprising:
    detecting another gesture covering multiple graphic tabs of the plurality of selectable graphic tabs; and
    displaying, on the display and based on the detected other gesture, a graphic element that represents changing of content.

11. The computing device-implemented method of claim 1, further comprising:
    detecting a scroll command corresponding to the selected graphic tab; and
    displaying, on the display, additional content items corresponding to the selected graphic tab.

12. The computing device-implemented method of claim 1, further comprising:
    detecting a scroll command that corresponds to an end of the set of content items; and
    displaying, on the display and based on the scroll command, content items from a next graphic tab of the plurality of selectable graphic tabs.

13. The computing device-implemented method of claim 12, further comprising:
    visually distinguishing the next graphic tab from the selected graphic tab.

14. A device comprising:
    a touch-screen display;
    a memory to store instructions; and
    a processing unit to execute the instructions to:
       display, on the touch-screen display, a graphical interface,
          the graphical interface including a plurality of selectable graphic tabs and a plurality of different content items,
             each of the plurality of selectable graphic tabs being associated with at least one of the plurality of different content items,
       detect a selection of a graphic tab, of the plurality of selectable graphic tabs, based on a touch gesture on the touch-screen display,
       determine, based on the detected selection, a set of content items, of the plurality of different content items, that corresponds to the selected graphic tab,
       display, on the touch-screen display, the set of content items that corresponds to the selected graphic tab,
       display the plurality of selectable graphic tabs, and
       remove, from display, each of the plurality of different content items that do not correspond to the selected graphic tab.

15. The device of claim 14, where the device includes a mobile phone.

16. The device of claim 14, where the processing unit further executes the instructions to:

retrieve the plurality of different content items from a remote server based on the detected selection of the graphic tab.

17. The device of claim 16, where the remote server is part of a cellular network.

18. The device of claim 14, where the plurality of different content items include at least one of
    multi-media files,
    documents, or
    photos.

19. The device of claim 14, where the processing unit further executes the instructions to:
    visually distinguish, based on the detected selection, the selected graphic tab from one or more non-selected graphic tabs of the plurality of selectable graphic tabs.

20. The device of claim 14, where the processing unit further executes the instructions to:
    detect another touch gesture covering multiple graphic tabs of the plurality of selectable graphic tabs, and
    display, on the touch-screen and based on the detected other touch gesture, a graphic element that represents a blur of content.

21. The device of claim 14, where the processing unit further executes the instructions to:
    detect a scroll command corresponding to the selected graphic tab, and
    display, on the touch-screen display, additional content items corresponding to the selected graphic tab.

22. The device of claim 14, where the processing unit further executes the instructions to:
    detect a scroll command that corresponds to an end of the set of content items; and
    display, on the touch-screen display and based on the scroll command, content items from a next graphic tab of the plurality of selectable graphic tabs.

23. The device of claim 22, where the processing unit further executes the instructions to:
    visually distinguish the next graphic tab from the selected graphic tab.

24. The device of claim 14, where the processing unit further executes the instructions to:
    detect, via the touch-screen display, selection of one of the content items of the set of displayed content items, and
    present the selected content item to the user.

25. A non-transitory computer-readable storage medium storing instructions, the instructions comprising:
    one or more instructions which, when executed by a processor of a device, cause the processor to:
       display a graphical interface,
          the graphical interface including a plurality of selectable graphic tabs and a plurality of different content items,
             each of the plurality of selectable graphic tabs being associated with at least one of the plurality of different content items;
       detect a selection of a graphic tab, of the plurality of selectable graphic tabs, based on a gesture made by a user of the device;
       determine, based on the detected selection, a set of content items, of the plurality of different content items, that corresponds to the selected graphic tab,
       display the set of the content items that corresponds to the selected graphic tab;
       display the plurality of selectable graphic tabs; and remove, from display, each of the plurality of different content items that do not correspond to the selected graphic tab.

* * * * *